US006356423B1

(12) United States Patent
Hastings et al.

(10) Patent No.: US 6,356,423 B1
(45) Date of Patent: Mar. 12, 2002

(54) SOILD STATE PROTECTION CIRCUIT FOR ELECTRICAL APPARATUS

(75) Inventors: Jerome Kenneth Hastings, Sussex; Karen Sjaarda Bland, Milwaukee; James Edward Hansen, Oak Creek; Scott Anderson Reid, Brookfield; David James Gritter, Wauwatosa; Edward Louis Wellner, Colgate; Engelbert Hetzmannseder, Milwaukee; William Edward Berkopec, Wauwatosa; Birger Pahl; Thomas Edward Strunsee, both of Milwaukee, all of WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/558,507

(22) Filed: Apr. 26, 2000

(51) Int. Cl.[7] .................................................. H02H 3/08
(52) U.S. Cl. ..................... 361/93.2; 361/94; 361/93.9
(58) Field of Search ............................. 361/93.1, 93.2, 361/93.9, 94–98, 101; 700/292, 293, 295, 296

(56) References Cited

U.S. PATENT DOCUMENTS

| 5,003,426 A | * | 3/1991 | Yeh et al. ..................... 361/59 |
| 5,216,352 A | * | 6/1993 | Studtmann et al. ......... 323/241 |
| 6,104,584 A | * | 8/2000 | Liu .............................. 361/18 |

* cited by examiner

Primary Examiner—Kim Huynh
(74) Attorney, Agent, or Firm—George E. Haas; Quarles & Brady LLP

(57) ABSTRACT

Electrical equipment is safeguarded from damage due to faults by a circuit that provides several levels of protection. A semiconductor switch and a current sensor are placed in series with the electrical equipment. When the current to the equipment exceeds a first threshold for a predefined period of time, the semiconductor switch is rendered non-conductive until the circuit is specifically reset. When the current to the equipment exceeds a greater second threshold, a pulsed signal alternately places the semiconductor switch in conductive and non-conductive states so that the average current applied to the equipment is within an acceptable level. Should the current exceed an even greater third threshold, the semiconductor switch is immediately rendered non-conductive until the circuit is manually reset.

19 Claims, 2 Drawing Sheets

SOILD STATE PROTECTION CIRCUIT FOR ELECTRICAL APPARATUS

BACKGROUND OF THE INVENTION

The present invention relates to mechanisms that protect equipment from damage due to electrical faults and short circuits; and particularly to such devices which electronically monitor performance of the electric equipment and take protective action in the event of a fault, short or overload.

It is important that electrical apparatus be protected from damage when electrical failures occur. For example, conventional fuses and electromechanical circuit breakers are commonly employed to disconnect equipment from an electrical supply upon detection of excessive current when a short circuit occurs. Nevertheless, these conventional protection devices are relatively slow in disconnecting the current flow to the apparatus being protected. As a consequence, enough excessive electrical current can flow into the equipment to cause damage during a fault.

Furthermore, various electrical apparatus require different response characteristics for the protection device. For example, electronic equipment may draw a substantially constant current level from initial start-up through a normal shut-down and be very intolerant of excessive current levels of even short duration. The protection device for such equipment has to respond very quickly to even relatively small over current conditions. Other types of electrical equipment draw large instantaneous current levels at certain times, such as upon start-up, in comparison to the current level drawn during remainder of their operation. Thus, a circuit protection device that responds too rapidly to an high current condition may inadvertently shut-off current to the equipment during normally occurring events. As a consequence, the protection device for this type of equipment must respond in a manner that tolerates brief high currents. The manner in which a protection device responds to over currents is referred to as the trip response characteristic or trip curve, and has to be matched to the particular type of electrical apparatus being protected.

This usually means that a manufacturer of protection devices must design, manufacture and stock in inventory, a large variety of protection devices that have different trip response characteristics in terms of current level and duration. Thus it is desirable to provide a basic configuration of a protection device which can be customized easily with different trip response characteristics.

SUMMARY OF THE INVENTION

An apparatus for protecting an electrical load from excessive current employs a semiconductor switch to connect the electrical load to a source of current. A current sensor is coupled in series with the semiconductor switch and produces a sensor signal that indicates the magnitude of current flowing to the electrical load.

A control circuit is connected to the current sensor and the semiconductor switch. The control circuit responds to the sensor signal by producing a control signal that is applied to a control input of the semiconductor switch. In a first mode of operation when the magnitude of current is less than a first threshold, the control circuit maintains the semiconductor switch in a continuous conductive state. When the magnitude of current is greater than the first threshold and less than a second threshold, the control circuit in a second mode of operation renders the semiconductor switch non-conductive after a predefined period of time. In a third mode of operation when the magnitude of current is greater than the second threshold, the semiconductor switch is alternately pulsed conductive and non-conductive by the control circuit to apply an average current through the load that is within an acceptable level wherein damage does not occur.

DETAILED DESCRIPTION OF THE INVENTION

Figure 1:
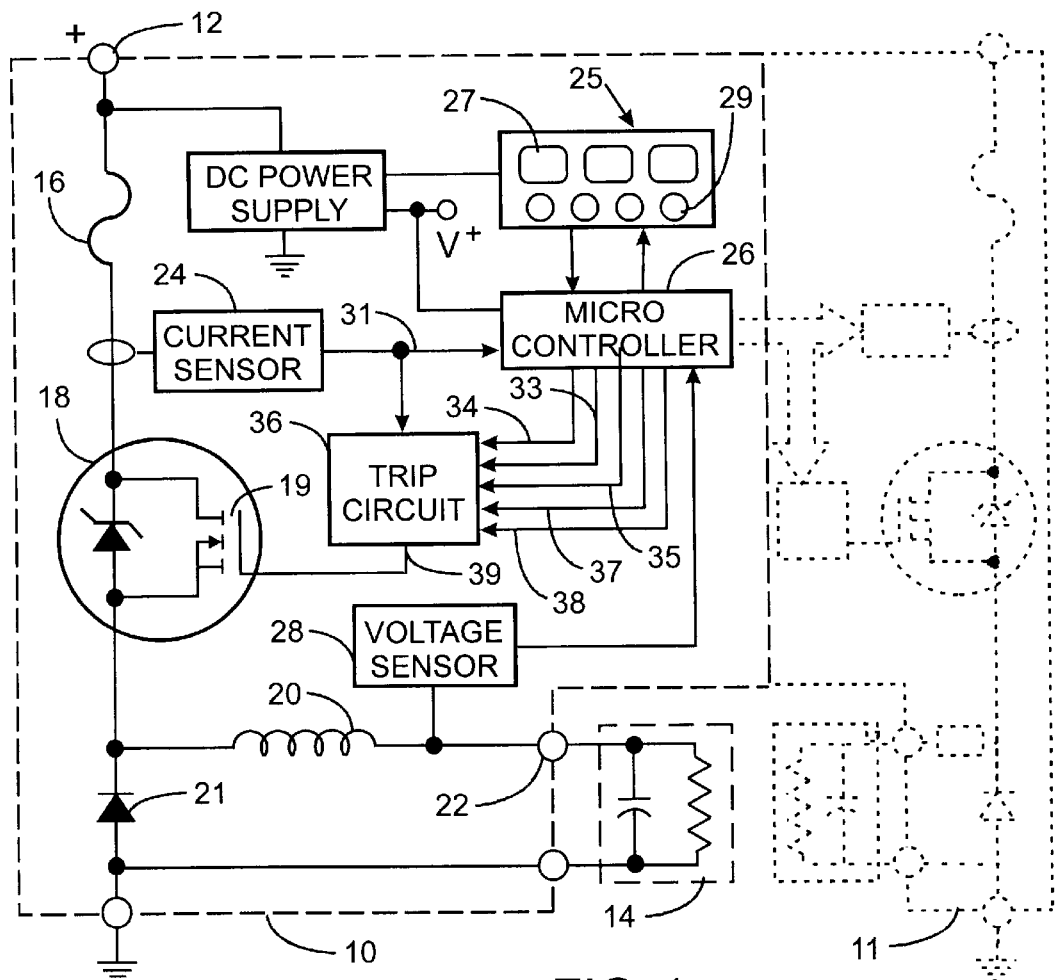
FIG. 1 is a block diagram of a solid state circuit protector according to the present invention.

With initial reference to FIG. 1, a solid state circuit protector 10 controls application of a direct current to an electrical load 14, depicted as capacitance in parallel with a resistance. The solid state circuit protector 10 has a positive voltage terminal 12 which is connected to the electrical source for powering a load 14. Current flows from the positive voltage terminal to the load through a back-up fuse 16, a semiconductor switch 18 and an inductor 20 to a load terminal 22. The load is connected between the load terminal 22 and the negative side of the voltage supply, represented as ground.

The back-up fuse 16 is a conventional device with a conductor which heats-up and ultimately breaks when excessive current flows for a given period of time. Standard devices, such as glass tube encased fuses or an appropriate trace on printed circuit board, can be employed for the back-up fuse 16. The back-up fuse 16 provides redundant protection in case the semiconductor switch 18 fails in the conductive state or upon failure of electronic circuits controlling the semiconductor switch. As will be understood, the trip response time of the back-up fuse is considerably slower than the trip response characteristic of the electronic circuit protection.

The semiconductor switch 18 must be able to interrupt the load current and handle transient currents, over currents and in-rush at a specified operational voltage range as dictated by the particular load 14 to be controlled. An n-channel field effect transistor (FET), such as model IRF1404 from International Rectifier of El Segundo, Calif. 90245 USA may be used as the semiconductor switch 18. The channel resistance in the conductive state has to be relatively low to minimize the voltage drop across the FET and the heat dissipation. Although the preferred embodiment employs the semiconductor switch 18 between the positive voltage terminal 12 and the load 14, alternatively the switch could be placed on the ground side of the load. However, this alternative approach has the disadvantage that a fault from load to ground would be unprotected.

A voltage sensor 28 produces an analog signal which indicates the voltage level at the load terminal. That analog signal is applied to an analog input of a microcontroller 26. As will be described, the microcontroller 26 responds to an indication from the sensor 28 that the voltage across the load 14 is too low by turning off the semiconductor switch 18.

A current sensor 24 is provided to detect the level of current flowing between the positive voltage terminal 12 and the load 14. This sensor must have a dynamic range which is large enough to cover the current extremes for the desired trip response characteristic of the protection device and have a transient response that is sufficiently fast to implement the desired trip response characteristic. The current sensor 24 may be a Hall effect sensor that produces an output voltage indicative of the DC current magnitude and which output voltage can be applied via line 31 directly to an analog input of a microcontroller 26. Other types of conventional current sensors, such as a shunt resistor, may be used to provide a current magnitude indication to the microcontroller 26.

The microcontroller 26 is microprocessor based and includes an internal analog-to-digital converter with a multiplexed input for signals from the current and voltage sensors. Digital input/output circuits of the microcontroller handle signals for other components of the solid state circuit protector 10. For example, a user control panel 25 has a keypad 27 and light emitters 29, such as LED's. The keypad 27 has separate momentary contact switches that supply input signals to the microcontroller 26 to manually turn the solid state circuit protector 10 on and off, as well as reset a trip condition. The light emitters 29 are powered by signals from the microcontroller to indicate the operational states of the circuit protector. One of those light emitters 29 indicates when the circuit protector 10 is tripped. The microcontroller 26 also has an internal non-volatile memory which stores a software program defining the protection function and which stores data, such as the trip response characteristic, for use by that software program. The microcontroller 26 and the control panel 25 optionally can control additional poles of a circuit protector as indicated by a second pole 11 drawn in phantom lines.

The microcontroller 26 operates the semiconductor switch 18 through a trip circuit 36 that generates a drive voltage which is adequate to control the FET 19 in the preferred embodiment of the semiconductor switch 18. Because the voltage driving the gate of an N-channel FET 19 has to be approximately ten volts greater than the voltage at the source electrode of the FET, the trip circuit 36 includes a charge pump or similar circuit to generate voltage greater than that found on the positive input terminal 12.

Figure 2:
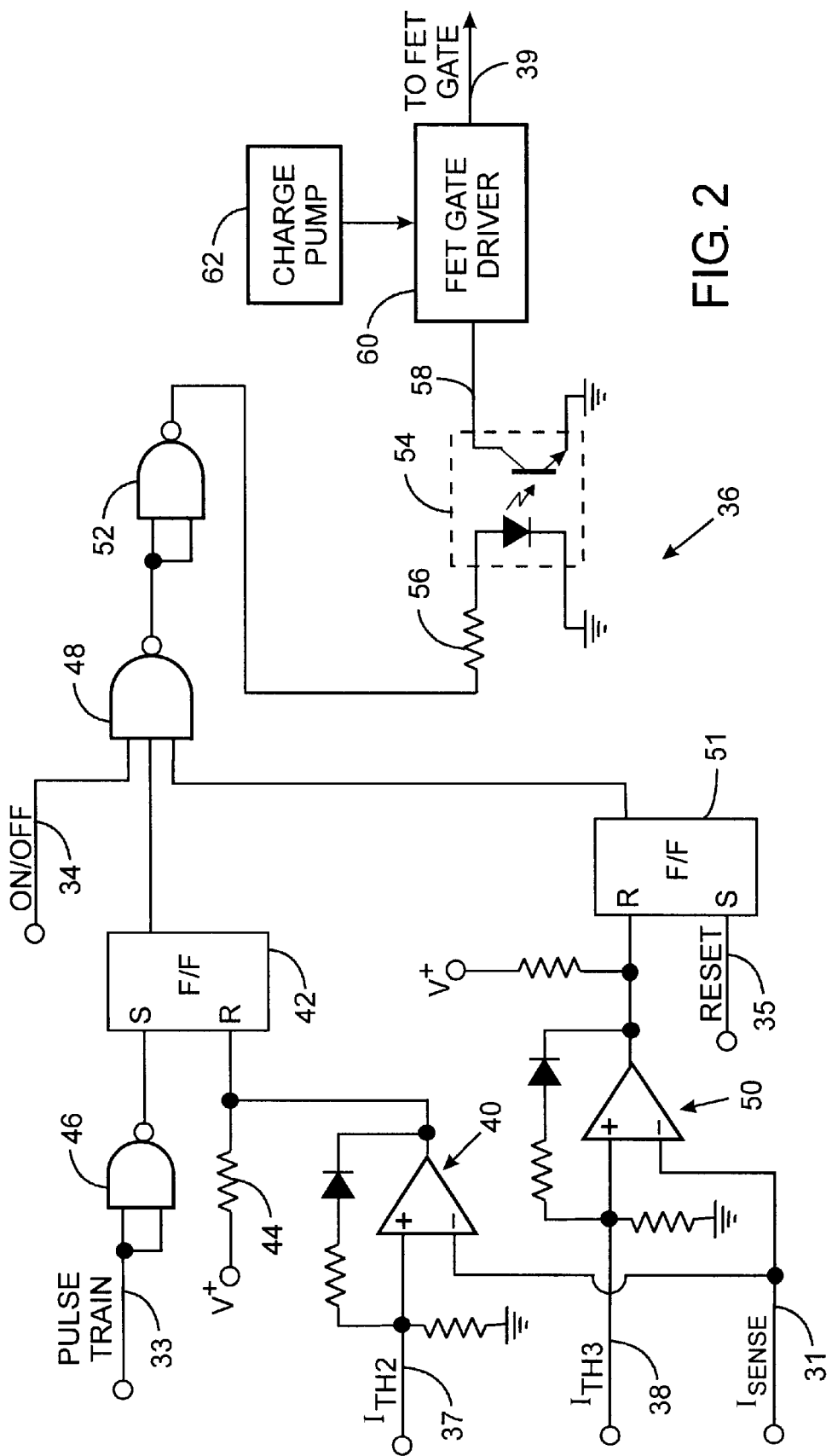
FIG. 2 illustrates the details of an instant trip circuit in the protector.

FIG. 2 illustrates the details of the trip circuit 36 wherein the output signal $I_{SENSE}$ on line 31 from the current sensor 24 is applied to a first voltage comparator 40. The sensed current level $I_{SENSE}$ is compared to a second threshold $I_{TH2}$ which is produced on an analog output line 37 of the microcontroller 26. A fixed value for the second threshold $I_{TH2}$ is programmed into the microcontroller 26 depending upon the over current tolerance of the specific load 14. The result of that comparison at the output of the first comparator 40 is applied to the RESET input of a flip-flop 42. The reset input also is connected to a positive supply voltage V+ by a pull-up resistor 44.

The SET input of the flip-flop 42 is connected to the output of a dual input NAND gate 46, having both inputs tied together to function as an inverter. The inputs of first NAND gate 46 are connected to a digital output line 33 from the microcontroller 26 which carries a pulsed signal at a fixed frequency in excess of 15 kHz., specifically in the range of 20–30 kHz. and preferably at 25 kHz. The pulsed signal has a fixed duty cycle thereby forming a train of constant-width pulses. As will be described, the pulse train periodically sets the flip-flop output which is tied to one input of a second NAND gate 48 having three inputs. Another input of the second NAND gate 48 receives an ON signal on another digital output line 33 from the microcontroller 26. Whether the ON signal is active or inactive is determined by manual operation of switches on keypad 27 of the control panel 25.

The third input of the second NAND gate 48 receives an output signal from an instant trip mechanism formed by a second voltage comparator 50 and a second flip-flop 51. Specifically, the second comparator 50 compares the current sensor output signal $I_{SENSE}$ to a third threshold $I_{TH3}$. The third current threshold $I_{TH3}$ is generated on another analog output line 38 by the microcontroller 26 and is defined by a fixed value programmed into the solid state protection circuit 10. The third current threshold $I_{TH3}$ is greater than the second current threshold $I_{TH2}$. The precise relationship between those two current thresholds will become apparent from a subsequent description of the operation of the solid state current protection circuit. The second and third current thresholds $I_{TH2}$ and $I_{TH3}$, instead of being programmable, may be set by conventional voltage dividers at the inputs to the respective comparators 40 and 50. The output of the second comparator 50 is latched by the second flip-flop 51 with an output connected to another input of the second NAND gate 48. The set input of the second comparator 50 is connected to RESET output line 35 from the microcontroller 26.

The components of the trip circuit 36 described thus far, provide input signals to the second NAND gate 48. The output of that gate is fed through a third NAND gate 52 which is connected as an inverter. The signal emanating from the third NAND gate 52 is coupled by a resistor 56 to an isolation circuit 54, such as a standard opto-isolator. The isolation circuit 54 produces an output on line 58 that is applied to an input of a conventional FET gate driver circuit 60. A charge pump 62 provides a voltage level that the FET gate driver 60 uses to bias the gate of the FET 19 via line 39.

The operation of the solid state circuit protector 10, in FIG. 1, commences with the operator pressing an appropriate switch on keypad 27. The microcontroller 26 responds to this switch activation by applying a high level, or active ON signal, via line 34 to the second NAND gate 48. At this time, the microcontroller 26 also begins producing a pulse train on digital output line 33 connected to the first NAND gate 46. A high logic level of that pulse train causes the output of the first flip-flop 42 to go high, applying another high level to another input of the second NAND gate 48.

During normal operation of the load 14, the output signal $I_{SENSE}$ from the current sensor 24 is less than the third threshold $I_{TH3}$. As a consequence, the second voltage comparator 50 produces a high logic level at the third input of the second NAND gate 48. Thus the second NAND gate 48 produces a low level output signal that, upon inversion by the third NAND gate 52 and conduction through isolator 54, activates the FET gate driver 60. This causes the gate driver 60 to bias the gate of the FET 19 into a conductive state, thereby applying current from the positive voltage terminal 12 through the inductor 20 to the load 14.

The level of current through the semiconductor switch 18 rises rapidly and soon exceeds the second threshold $I_{TH2}$. At that time, the output of the first comparator 40 goes low resetting the flip-flop 42 and causing the second NAND gate 48 to change output states. This results in the FET gate driver 60 rendering the semiconductor switch 18 non-conductive. The energy stored in the inductor 20 produces a decaying current that flows through the load 14 and the fly back diode 21.

When the next positive pulse occurs in the pulse train on line 33 to the first NAND gate 46, the flip-flop 42 will be SET to produce another high logic output level which once again turns on the FET gate driver 60 and the semiconductor switch 18. This on-off cycling of the semiconductor switch continues chopping the current at the rate of the signal on line 33 until the capacitance in the load 14 adequately charges, at which time the load current becomes substantially constant at a level less than the second threshold $I_{TH2}$. Thus the load current during start-up is limited to being less than the second threshold $I_{TH2}$ while still applying current to initialize the load operation. Once the excursions of current through the semiconductor switch 18 fall below this threshold, the flip-flop 42 no longer is reset and the FET gate driver 60 maintains the semiconductor switch 18 in a conductive state. That conductive state continues as long as the load 14 functions normally.

If there is a fault with the load during start-up, the load current does not drop below the second threshold $I_{TH2}$. The current chopping could continue indefinitely in this case. To prevent that, the duration of the current chopping is limited by counting the current pulses applied to the load and terminating the chopping upon the occurrence of given number of pulses that normally is sufficient to charge a typical load capacitance. Specifically, the microcontroller 26 monitors the input line 31 from the current sensor 24 which indicates alternate high current and zero current conditions and counts the number of high current pulses. That count is compared to a reference number and the chopping mode is terminated when that reference number of current pulses has occurred. At that time, the microcontroller 26 sends a low logic level signal on line 34 to the trip circuit 36, which renders the semiconductor switch non-conductive until a person presses the RESET switch on the control panel 25 and resets the microcontroller.

Alternatively the voltage sensor 28 can be employed to safeguard against operating in the current chopping mode for too long a time period. During a short circuit condition when the load 14 is drawing excessive current, the voltage across the load will be significantly lower than during normal operation. The voltage across the load 14 is detected by the voltage sensor 28 which applies an analog voltage level indication to the microcontroller 26. If that sensed load voltage remains below a given threshold for greater than a predefined time interval during the current chopping mode, the microcontroller 26 turns off the trip circuit 36 by applying a low logic level, (an inactive ON signal) to the ON/OFF line 34.

Figure 3:
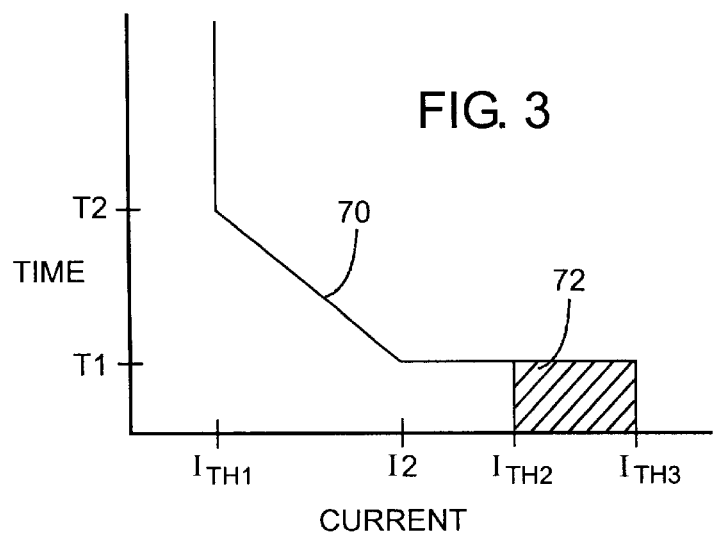
FIG. 3 is a graph of an exemplary trip response characteristic of the solid state circuit protector.

The operation of the solid state protection circuit 10 during an over current condition after a normal start-up may best be understood with respect to an exemplary trip response characteristic, such as the one depicted in FIG. 3. A load current which is below a first threshold $I_{TH1}$ can be tolerated indefinitely by the load 14 and thus will be conducted continuously by the semiconductor switch 18. The first threshold $I_{TH1}$ is set between 100% and 125% of the current rating for the load 14 being protected. Load currents between levels $I_{TH1}$ and I2 can be tolerated by the load for an amount of time which is inversely proportional to the current magnitude. In other words, small deviations above the first threshold $I_{TH1}$ can be tolerated for a longer period of time than over currents which approach level I2. This produces a linear trip response characteristic in portion 70 of the trip response curve. This portion of the trip response characteristic is programed into the microcontroller 26 and stored in its memory either as a linear equation or as a data table. That data table has pairs of values with one value being a current magnitude and the other value defining a time interval during which that current magnitude can be tolerated before the solid state circuit protector 10 must trip.

Current between level I2 and the third threshold $I_{TH3}$ can be tolerated by the load for a period designated T1. Current above that higher level $I_{TH3}$ cannot be tolerated by the load 14, even momentarily, and thus the current protection device will trip immediately. It should be noted, that load current within the cross-hatched region 72 between second threshold $I_{TH2}$ and a third threshold $I_{TH3}$ while tolerated by the load 14, can damage the FET 19. Thus, when operation within this region is determined to occur, the solid state circuit protector 10 enters a current chopping mode of operation. In this mode the semiconductor switch is pulsed on and off at a rate which produces an average current that is less than the second threshold $I_{TH2}$. Thus the load remains powered so that the load capacitance remains charged but the current applied to the load is limited to that second threshold level.

When the sensed current $I_{SENSE}$ is between the first threshold $I_{TH1}$ and a second threshold $I_{TH2}$, the trip circuit 36 initially maintains semiconductor switch 18 in a conductive state because that current is below the two comparator thresholds $I_{TH2}$ and $I_{TH3}$. However, the microcontroller 26 receives the output signal $I_{SENSE}$ from the current sensor 24 on line 31 utilizes the programed trip response characteristic for section 70 to determine whether to turn-off the semiconductor switch 18. Specifically, the microcontroller 26 determines whether the over current magnitude has occurred for the time period defined by the trip response characteristic. Once that has occurred, the microcontroller 26 turns off the trip circuit 36 by applying a low logic level, inactive ON signal, to the digital line 34. This constant low logic level toggles the output level from the second NAND gate 48 which turns-off the FET gate driver 60 and thus the semiconductor switch 18. The microcontroller 26 also illuminates the light emitter 29 on the control panel 25 which indicates the tripped condition. The OFF signal continues to be applied by the microcontroller 26 to the trip circuit 36 until a manual reset switch on the control panel 25 pressed.

When the sensed load current signal $I_{SENSE}$ is between the current thresholds $I_{TH2}$ and $I_{TH3}$, the microcontroller 26 does not utilize the trip response characteristic data to determine whether to turn-off the trip circuit 36. Instead, the solid state protection circuit 10 enters a current chopping mode in which the FET 19 is pulsed on and off at the rate of the pulsed signal on line 33.

Specifically with reference to FIG. 2, when the current sensor 24 produces an output signal $I_{SENSE}$ on line 31 which is greater than the second threshold $I_{TH2}$ on line 37, the output of first comparator 40 goes low. That low output resets the flip-flop 42, thereby applying a low logic level to an input of the second NAND gate 48. This produces a high logic level at the output of the second NAND gate 52 which is inverted by the third NAND gate 52 thus applying a low logic level to the opto-isolator 54. This in turn deactivates the FET gate driver 60 which renders the semiconductor switch 18 nonconductive. At that time current from the inductor 20 flows through the load 14 and a fly back diode 21.

The semiconductor switch 18 remains off until the next high logic level pulse in the pulse train from the microcontroller 26 that is applied to the trip circuit 36 on digital line 33. That pulse upon inversion by the first NAND gate 46 sets the flip-flop 42 which produces a high output level that is applied to the second NAND gate 48. This high logic level activates the FET gate driver 60, once again rendering the semiconductor switch 18 conductive.

When the FET 19 turns on again, the inductor 20 limits the rate at which the current rises so that the current level does not immediately exceed the second threshold $I_{TH2}$. Thus, a small amount of current will be applied to the load 14 and charging its capacitance. However, the current through the semiconductor switch 18 eventually rises above the second current threshold $I_{TH2}$ which will be detected by the first comparator 40. When this occurs the first comparator 40 changes output states and resets the flip-flop 42, which in turn applies a signal to the second NAND gate 48 that ultimately results in the FET gate driver 60 shutting off the semiconductor switch 18. This cycling of the semiconductor switch 18 off and on continues which results in an average load current that is below the first threshold $I_{TH1}$.

Although the semiconductor switch 18 is not exposed to as great a degree of thermal stress as with linear current limiting, damage to the FET 19 or the load still may occur if the current chopping mode continues for too long a time period. As discussed previously with respect the start-up operation of the solid state circuit protector 10, the duration of the current chopping can be limited by the microcontroller 26 counting the number of current pulses applied to the load and sending a low logic level OFF signal on line 34 to the trip circuit 36 when a given number of pulses has occurred. Alternatively the voltage sensor 28 can be employed to detect a short circuit and inform the microcontroller 26 to turn-off the trip circuit 36.

The current chopping should ensure that the load current never exceeds the third threshold level $I_{TH3}$. However, in the event that a malfunction occurs, the second comparator 50 detects a load current above that third threshold level $I_{TH3}$ and produces an output that renders the semiconductor switch 18 continuously non-conductive. Specifically, the output of the second comparator 50 goes low which resets the second flip-flop 51 thereby applying a low logic level to the second NAND gate 48. This results in the FET turning off.

We claim:

1. An apparatus for protecting an electrical load from excessive current, which apparatus comprises:
    a semiconductor switch for connecting the electrical load to a source of current and having a control input;
    a current sensor coupled to the semiconductor switch and producing a sensor signal indicative of a magnitude of current flowing to the electrical load; and
    a control circuit connected to the current sensor and the semiconductor switch and responding to the sensor signal by producing a control signal that is applied to the control input, the control circuit having a first mode of operation when the magnitude of current is less than a first threshold wherein the semiconductor switch is maintained in a continuous conductive state, a second mode of operation when the magnitude of current is greater than the first threshold and less than a second threshold wherein the semiconductor switch is rendered non-conductive after a predefined period of time, and a third mode of operation when the magnitude of current is greater than the second threshold wherein the semiconductor switch is alternately pulsed conductive and non-conductive to limit the current through the load to less than the second threshold.

2. The apparatus as recited in claim 1 wherein the control circuit remains in the second mode of operation until specifically reset.

3. The apparatus as recited in claim 1 wherein the semiconductor switch is alternately pulsed conductive and non-conductive for cycles having identical periods.

4. The apparatus as recited in claim 1 wherein the semiconductor switch is alternately pulsed conductive and non-conductive at a rate of at least 15 kHz.

5. The apparatus as recited in claim 1 wherein the semiconductor switch is alternately pulsed conductive and non-conductive at a rate between 20 kHz and 30 kHz.

6. The apparatus as recited in claim 1 wherein the control circuit has a fourth mode of operation when the magnitude of current is greater than a third threshold that is greater than the second threshold, wherein the semiconductor switch is rendered non-conductive by the control signal until the apparatus is specifically reset.

7. The apparatus as recited in claim 1 wherein the control circuit comprises:
    a programmable controller which produces a pulsed signal having a constant duty cycle and an ON signal;
    a switch driver that produces the control signal in response to a switch activation signal; and
    a trip circuit connected to the programmable controller, the switch driver and the current sensor, said trip circuit including a logic circuit that produces the switch activation signal when the sensor signal is less than the second threshold and the ON signal is active, and that produces a pulsed switch activation signal in response to the pulsed signal when the sensor signal is greater than the second threshold and the ON signal is active.

8. The apparatus as recited in claim 7 wherein the programmable controller produces an inactive ON signal in response to the magnitude of current being greater than the first threshold for the predefined period of time.

9. The apparatus as recited in claim 8 wherein the programmable controller stores data specifying the predefined period of time as a function of the magnitude of current.

10. The apparatus as recited in claim 7 wherein the trip circuit comprises:
    a first comparator that compares the sensor signal to the second threshold and in response produces a first control signal at an output;
    a flip-flop having one input connected to the output of the first comparator and another input connected to the programmable controller to receive the pulsed signal, and having an output; and
    a logic gate having one input connected to the output of the flip-flop and another input connected to the programmable controller to receive the ON signal, and having an output coupled to the switch driver.

11. The apparatus as recited in claim 10 wherein the trip circuit further comprises a second comparator that compares the sensor signal to a third threshold and has an output coupled to the logic gate to render the semiconductor switch non-conductive when the sensor signal exceeds the third threshold.

12. The apparatus as recited in claim 1 further comprising a fuse in series with the semiconductor switch.

13. A method for protecting an electrical load from an excessive magnitude of current, which method comprises:
    placing a semiconductor switch into a conductive state to apply current from a source to the electrical load;
    sensing the magnitude of the current;
    comparing the magnitude of the current to a first threshold;
    comparing the magnitude of the current to a second threshold that is greater than the first threshold;
    determining when the magnitude of the current exceeds the first threshold for a predefined period of time and when that occurs issuing a termination signal;

in response to the termination signal, placing the semiconductor switch in a non-conductive state to terminate application of current to the electrical load; and when the magnitude of the current exceeds the second threshold, alternately placing the semiconductor switch in conductive and non-conductive states to apply current pulses to the electrical load and limit the average current through the load to less than the second threshold.

14. The method as recited in claim 13 wherein alternately placing the semiconductor switch conductive and non-conductive states apply current pulses in cycles having identical periods.

15. The method as recited in claim 13 further comprises determining how long the semiconductor switch is alternately placed in conductive and non-conductive states; and placing the semiconductor switch in a continuous non-conductive state after a predetermined period of time.

16. The method recited in claim 13 further comprising:

sensing a magnitude of voltage across the electrical load;

comparing the magnitude of voltage to a given threshold; and placing the semiconductor switch in a continuous non-conductive state, when the magnitude of voltage is less than the given threshold for a predetermined period of time.

17. The method as recited in claim 13 further comprising:

comparing the magnitude of the current to a third threshold that is greater than the second threshold; and placing the semiconductor switch in a continuous non-conductive state when the magnitude of the current exceeds the third threshold.

18. The apparatus as recited in claim 13 wherein alternately placing the semiconductor switch conductive and non-conductive states applies current pulses to the electrical load at a rate of at least 15 kHz.

19. The apparatus as recited in claim 13 wherein alternately placing the semiconductor switch conductive and non-conductive states applies current pulses to the electrical load at a rate between 20 kHz and 30 kHz.

* * * * *